(12) United States Patent
Kim

(10) Patent No.: US 9,720,637 B2
(45) Date of Patent: Aug. 1, 2017

(54) DISPLAY DEVICE

(71) Applicant: SAMSUNG DISPLAY CO., LTD., Yongin-si, Gyeonggi-do (KR)

(72) Inventor: Hyo-Jin Kim, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 48 days.

(21) Appl. No.: 14/473,638

(22) Filed: Aug. 29, 2014

(65) Prior Publication Data

US 2015/0301782 A1  Oct. 22, 2015

(30) Foreign Application Priority Data

Apr. 16, 2014 (KR) ........................ 10-2014-0045307

(51) Int. Cl.
| | |
|---|---|
| *G09G 3/14* | (2006.01) |
| *G09G 3/32* | (2016.01) |
| *G09G 3/34* | (2006.01) |
| *G09G 3/36* | (2006.01) |
| *G06F 3/147* | (2006.01) |
| *G06F 3/14* | (2006.01) |
| *G09G 3/3208* | (2016.01) |
| *G09G 3/00* | (2006.01) |
| G09G 3/3225 | (2016.01) |

(52) U.S. Cl.
CPC ........... *G06F 3/1446* (2013.01); *G09G 3/003* (2013.01); *G09G 3/3208* (2013.01); *G06F 3/147* (2013.01); *G09G 3/3225* (2013.01); *G09G 2300/023* (2013.01); *G09G 2300/026* (2013.01); *G09G 2360/04* (2013.01); *G09G 2360/06* (2013.01)

(58) Field of Classification Search
CPC .......... G06F 3/1446; G06F 3/147; G06F 1/16; G06F 1/1601; G06F 1/1624; G06F 3/1438; G09G 3/3208; G09G 3/344; G09G 3/36; G02B 27/02; G02B 27/22; G02B 27/26; G02B 27/2214; G02F 1/1335; H04N 13/00; H04N 13/0402; H04N 13/0422
See application file for complete search history.

(56) References Cited

U.S. PATENT DOCUMENTS 7,619,585 B2 * 11/2009 Bell ....................... G09G 3/003
                                                          345/1.3
8,760,367 B2 * 6/2014 Yoshino ................ G06F 3/1438
                                                          345/4

(Continued)

FOREIGN PATENT DOCUMENTS

| KR | 10-2010-0027502 A | 3/2010 |
| KR | 10-2013-0002708 A | 1/2013 |
| KR | 10-2013-0046386 A | 5/2013 |

*Primary Examiner* — Jennifer Mehmood
*Assistant Examiner* — Sardis F Azongha
(74) *Attorney, Agent, or Firm* — Innovation Counsel LLP

(57) ABSTRACT

A display device includes a first display unit and a second display unit disposed parallel with the first display unit in a first position or a second position, wherein the first display unit and the second display unit overlap in the first position and are extended out in the second position. The display device further includes a sliding unit having at least one engaging groove which the first display unit and the second display unit are inserted into and slide through, a first driving unit disposed on one side of the first display unit, and a second driving unit disposed on one side of the second display unit.

19 Claims, 11 Drawing Sheets

(56) References Cited

U.S. PATENT DOCUMENTS

| | | | |
|---|---|---|---|
| 8,878,746 B2* | 11/2014 | Lock | G09G 3/20 |
| | | | 345/1.3 |
| 8,964,365 B2* | 2/2015 | Kim | H04M 1/0237 |
| | | | 361/679.04 |
| 2005/0253775 A1* | 11/2005 | Stewart | G06F 1/1616 |
| | | | 345/1.1 |
| 2005/0285811 A1* | 12/2005 | Kawase | G02F 1/13336 |
| | | | 345/1.1 |
| 2006/0133047 A1* | 6/2006 | Tomizuka | A63F 13/08 |
| | | | 361/716 |
| 2013/0053100 A1* | 2/2013 | Song | H04N 13/0497 |
| | | | 455/556.1 |

* cited by examiner

DISPLAY DEVICE

CROSS-REFERENCE TO RELATED APPLICATION

This application claims priority to and the benefit of Korean Patent Application No. 10-2014-0045307 filed on Apr. 16, 2014 with the Korean Intellectual Property Office, the disclosure of which is incorporated herein in its entirety by reference.

BACKGROUND

1. Technical Field

The present disclosure relates to a display device including a display unit having an increased size. In particular, the viewing visibility and operational convenience of the display device can be improved by increasing the size of the display unit.

2. Description of the Related Art

With the recent technological developments in display devices, there is a demand for display devices having a wide range of sizes. More particularly, there is a need for large sized display devices with improved viewing visibility and operational convenience. For example, large sized display devices can allow users to watch moving pictures and DMB programs and read electronic books on a wide screen.

However, when the size of the display unit is increased, the display device may be easily damaged by external shocks. Also, users may find it difficult to carry the display device around.

Meanwhile, many different types of content (for example, movies, games, text messengers, etc.) are increasingly being provided on display devices. As such, there is a need for a display device that is sufficiently sized to display the different types of content on a same screen. In particular, there is a need for a display device including a multi-window configured to simultaneously display two or more types of content.

However, current portable display devices (such as smartphones) have fixed-size screens, and typically do not include screens of different sizes to optimally display different types of content on a same device. For example, current portable display devices lack a multi-window configured to simultaneously display two or more types of contents.

Accordingly, there is a need for a display device that has improved portability and that can be configured to simultaneously display a variety of content.

The above information disclosed in this Background section is only for enhancement of understanding of the background of the inventive concept and therefore it may contain information that does not form the prior art that is already known in this country to a person of ordinary skill in the art.

SUMMARY

The present disclosure addresses the above need for a display device that has improved portability and that can be configured to simultaneously display a variety of content. More specifically, embodiments of the display device according to the inventive concept include a screen that can be adjusted in size to provide a wide range of sizes for simultaneously displaying a variety of content.

According to an embodiment of the inventive concept, a display device includes: a first display unit; a second display unit disposed parallel with the first display unit in a first position or a second position, wherein the first display unit and the second display unit overlap in the first position and are extended out in the second position; a sliding unit having at least one engaging groove which the first display unit and the second display unit are inserted into and slide through; a first driving unit disposed on one side of the first display unit; and a second driving unit disposed on one side of the second display unit.

In one embodiment, the first display unit and the second display unit may include flat panel display substrates.

In one embodiment, the first display unit and the second display unit may have a same area.

In one embodiment, the first display unit and the second display unit may be alternately disposed by one pixel width.

In one embodiment, the sliding unit may further include: a first sliding unit engaged with one end portion of the first display unit and one end portion of the second display unit; and a second sliding unit engaged with the other end portion of the first display unit and the other end portion of the second display unit.

In one embodiment, the first sliding unit and the second sliding unit may be disposed facing each other.

In one embodiment, the first display unit and the second display unit may include engaging protrusions formed on at least one end portion of the first display unit and the second display unit, respectively, and the engaging protrusions may be inserted into the engaging groove.

In one embodiment, the sliding unit may further include: a first engaging groove in which the engaging protrusion formed on the end portion of the first display unit is inserted; and a second engaging groove in which the engaging protrusion formed on the end portion of the second display unit is inserted.

In one embodiment, the second engaging groove may be disposed parallel with the first engaging groove.

In one embodiment, the second engaging groove may include at least one end portion provided in a bending form bending towards the first engaging groove.

In one embodiment, the sliding unit may further include a locking groove formed on the bending portion of the second engaging groove.

In one embodiment, the sliding unit may further include a stopper configured to affix the engaging protrusions.

In one embodiment, the first display unit may include one of an organic light emitting diode (OLED) element, a liquid crystal display element, and an electrophoretic element.

In one embodiment, the second display unit may include one of an organic light emitting diode (OLED) element, a liquid crystal display element, and an electrophoretic element.

In one embodiment, the first display unit and the second display unit may respectively display a left image and a right image having different parallax when the first display unit and the second display unit overlap.

In one embodiment, the first display unit and the second display unit may display a single high resolution image when the first display unit and the second display unit overlap.

In one embodiment, a single image may be divided into two parts and the first display unit and the second display unit may respectively display the parts of the divided image when the first display unit and the second display unit are extended out.

In one embodiment, the first display unit and the second display unit may display different images when the first display unit and the second display unit are extended out.

According to the embodiments of the inventive concept, the display device includes a display unit having an adjustable screen size. In addition, two or more computing processes can be simultaneously performed on the divided screen of the display device.

BRIEF DESCRIPTION OF THE DRAWINGS

The above and other features and aspects of the inventive concept will be more clearly understood from the following detailed description when taken in conjunction with the accompanying drawings.

DETAILED DESCRIPTION

Figure 1:
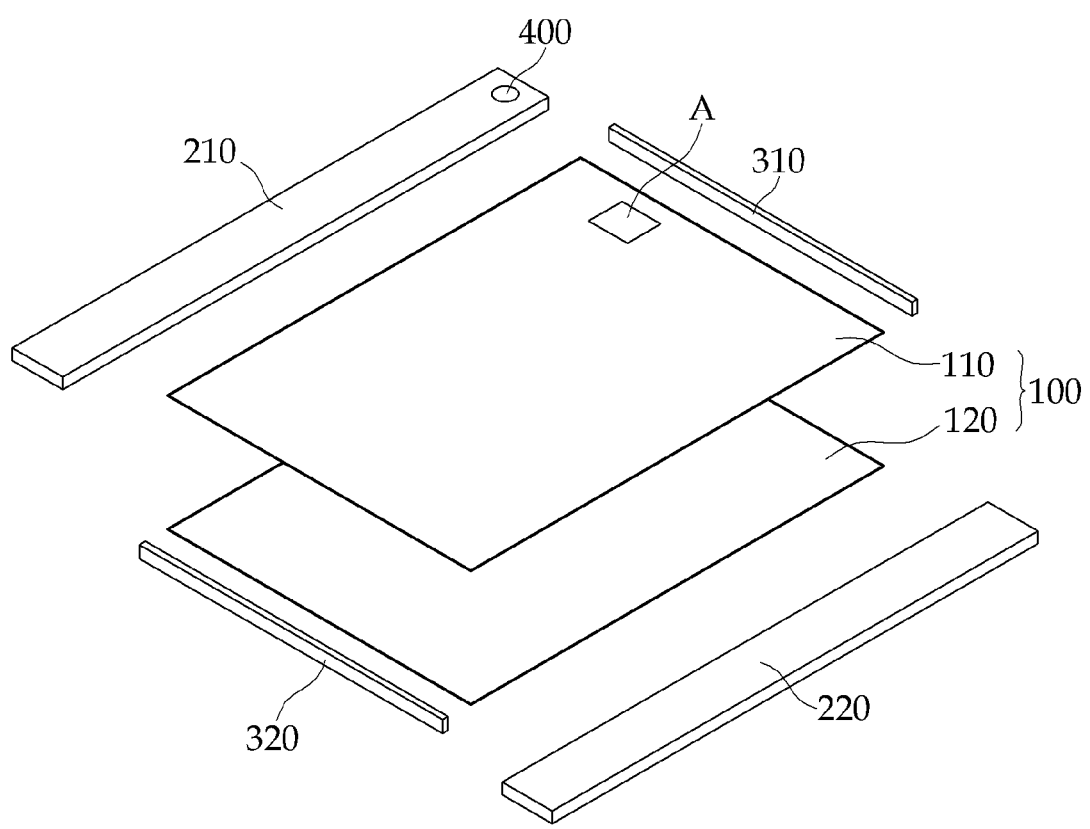
FIG. 1 is a schematic exploded perspective view illustrating a configuration of a display device according to an embodiment of the inventive concept.

The inventive concept will be described more fully herein with reference to the accompanying drawings, in which exemplary embodiments are shown. As those skilled in the art would realize, the described embodiments may be modified in various different ways without departing from the spirit or scope of the inventive concept.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Spatially relative terms, such as "below," "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "lower" relative to other elements or features would then be oriented "above" or "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used in this specification is merely used to describe embodiments of the inventive concept and should not be construed as limiting the inventive concept. An expression used in the singular can encompass the expression of the plural unless it has a clearly different meaning in the context. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by those skilled in the art. It will be further understood that terms, such as those defined in commonly used dictionaries, should be interpreted as having a meaning that is consistent with their meaning in the context of the relevant art and should not be interpreted in an idealized or excessively formal sense unless clearly defined in the present application.

First, a display device according to an embodiment of the inventive concept will be described in detail with reference to FIGS. 1 to 6.

Figure 4:
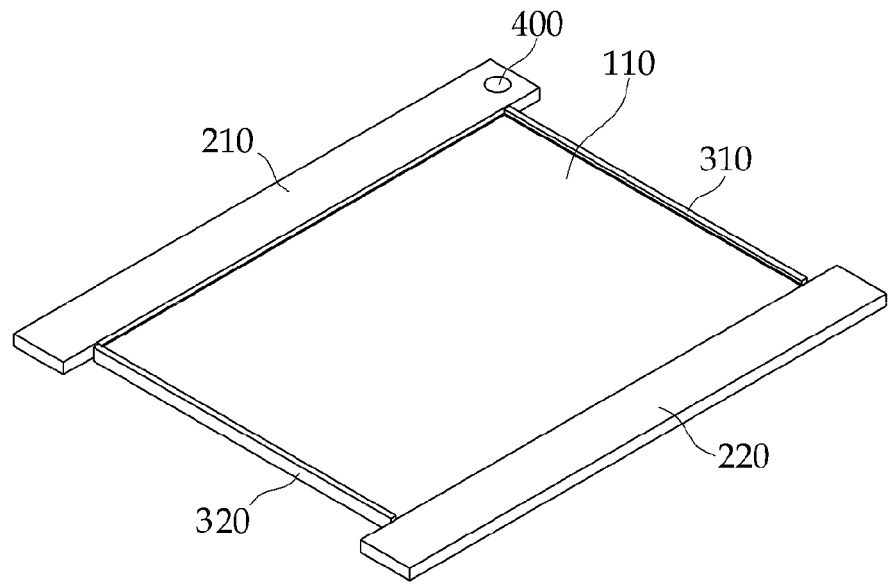
FIG. 4 is a schematic perspective view illustrating the display device of FIG. 1 in a first mode.
Figure 5:
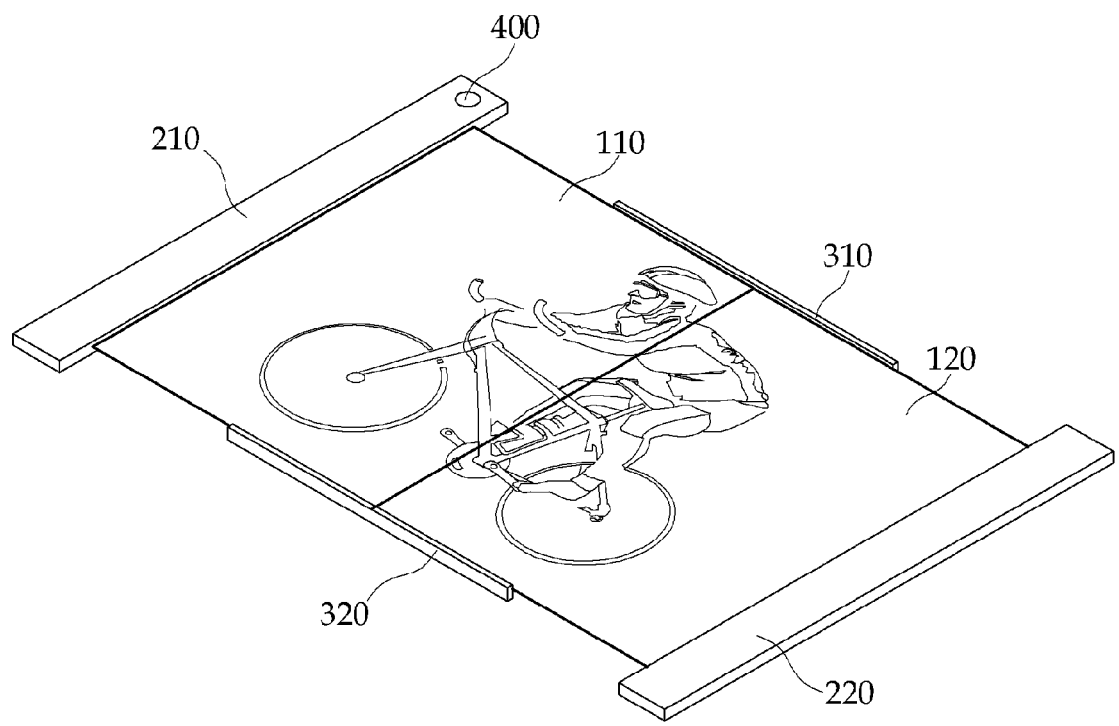
FIG. 5 is a schematic perspective view illustrating the display device of FIG. 1 in a second mode.
Figure 6:
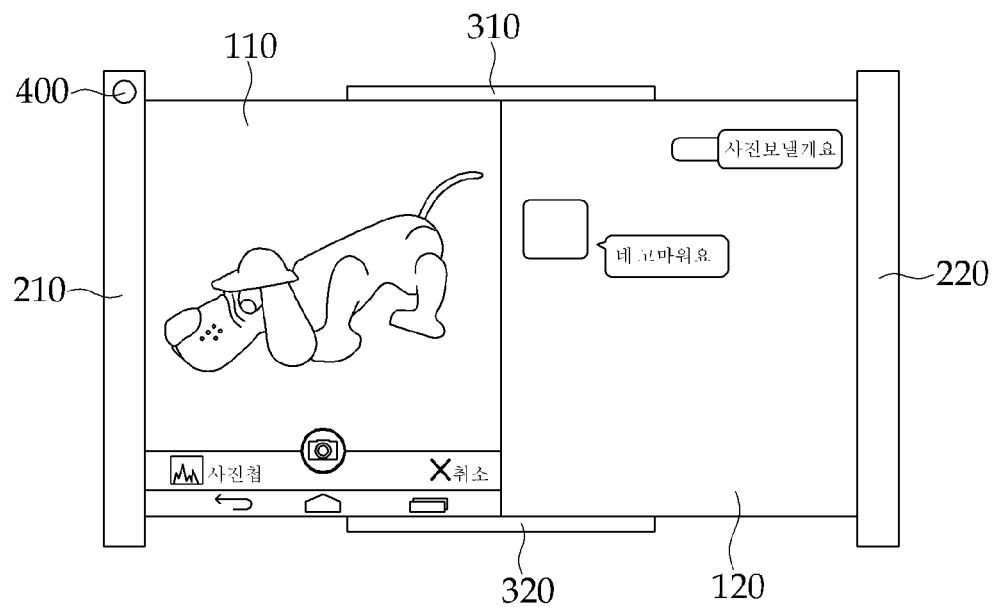
FIG. 6 is a schematic plan view illustrating the display device of FIG. 1 in a multi-processing mode.

FIG. 1 is a schematic exploded perspective view illustrating a configuration of a display device according to an embodiment of the inventive concept. FIG. 4 is a schematic perspective view illustrating the display device of FIG. 1 in a first mode. FIG. 5 is a schematic perspective view illustrating the display device of FIG. 1 in a second mode. FIG. 6 is a schematic plan view illustrating the display device of FIG. 1 in a multi-processing mode.

With reference to FIGS. 1 to 6, a display device according to an embodiment of the inventive concept includes a first display unit 110, a second display unit 120, a first driving unit 210, a second driving unit 220, a first sliding unit 310, a second sliding unit 320, and a camera 400. The display device can be configured to display a three-dimensional (3D) image or a two-dimensional (2D) image.

Meanwhile, as illustrated in FIG. 4, when the display device is in the first mode, the first display unit 110 and the second display unit 120 overlap each other when displaying an image. A basic mode represents a case where a two-dimensional image is displayed in the first mode. An overlap mode represents a case where a three-dimensional image is displayed in the first mode.

As illustrated in FIGS. 5 and 6, when the display device is in the second mode, the first display unit 110 and the second display unit 120 are extended out (except at a predetermined portion in the middle) when displaying an image. A wide mode represents a case where one image is displayed in the second mode, as illustrated in FIG. 5. A separation mode represents a case where different images are respectively displayed in the first display unit 110 and the second display unit 120 in the second mode, as illustrated in FIG. 6.

Next, the overlap mode of the first mode will be described. As mentioned above, a three-dimensional image is displayed in the overlap mode.

The display unit 100 according to an embodiment of the inventive concept includes the first display unit 110 and the second display unit 120. The first display unit 110 is configured to display a left image. The second display unit 120 is configured to display a right image having a predetermined binocular parallax with a left image, and is arranged in contact with the first display unit 110.

The first display unit 110 includes a flat display substrate. The first display unit 110 may be a transparent display panel. For example, the OLED display may include a transparent organic light emitting layer. When transparent electrodes are being used as electrodes on both sides of the transparent organic light emitting layer, a transparent display device can thus be realized.

The first display unit 110 is configured to output a left image. Here, the left image is the same as a left image output from a comparative stereoscopic image display but is distinct in that the image is not supposed to be viewed by only a left eye of a user.

Next, a configuration of the first display unit 110 will be described with reference to FIGS. 2 and 3.

Figure 2:
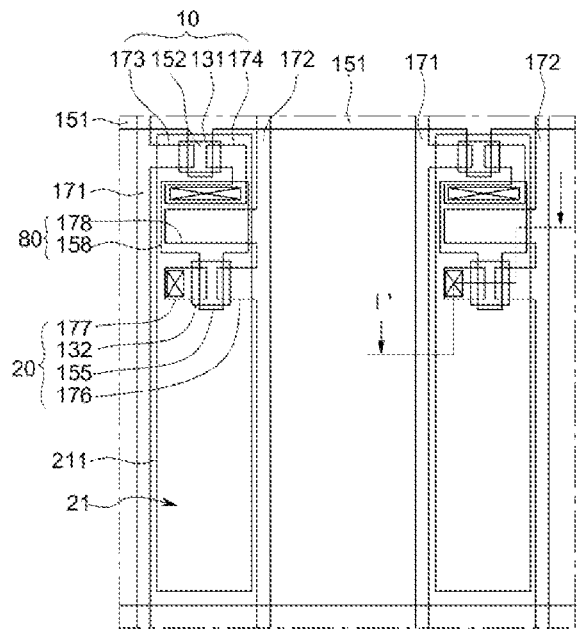
FIG. 2 is an enlarged partial plan view of the portion "A" of FIG. 1.

FIG. 2 is an enlarged partial plan view of the portion "A" of FIG. 1. FIG. 3 is a cross-sectional view taken along line I-I' of FIG. 2.

Figure 3:
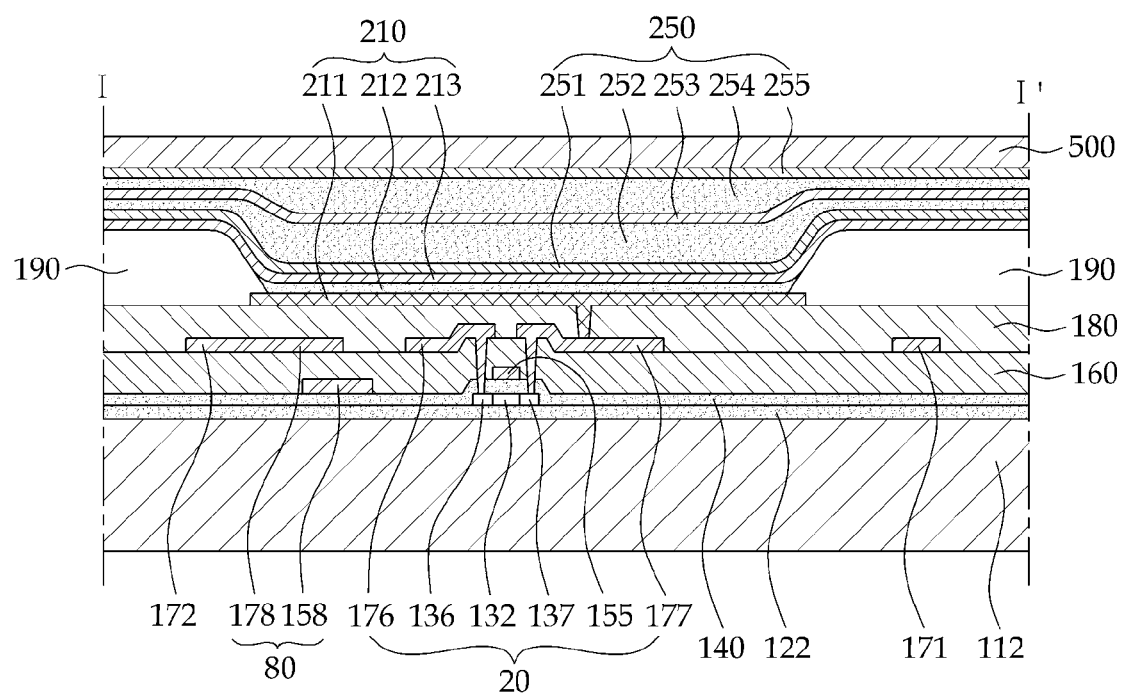
FIG. 3 is a cross-sectional view taken along line I-I' of FIG. 2.

With reference to FIGS. 2 and 3, the first display unit 110 according to an embodiment of the inventive concept includes a plurality of pixels including a switching thin film transistor 10, a driving thin film transistor 20, a capacitor 80, and an OLED 21. The OLED 21 may be used in a flexible display device. Notably, the OLED 21 can be deposited at relatively low temperatures, has low power consumption, and exhibits high luminance. Herein, a pixel refers to the smallest unit for displaying an image. Accordingly, the first display unit 110 displays an image through the plurality of pixels.

In the drawings, one pixel is depicted as having two thin film transistors TFTs and a capacitor; however, embodiments of the inventive concept are not limited thereto. For example, the pixel may have many different configurations including three or more thin film transistors, two or more capacitors, and/or additional wirings.

The first display unit 110 includes a gate line 151 on the first substrate 112, and a data line 171 and a common power source line 172 insulated from and intersecting the gate line 151. A pixel may be defined by the area intersected between the gate line 151, the data line 171, and the common power source line 172, but is not limited thereto. For example, in some other embodiments, the pixel may also be defined by a black matrix or a pixel defining layer.

The first substrate 112 may be made of a polymer material having a transparent property, such as plastics. In more detail, the first substrate 112 may include at least one polymer material selected from a group comprising kapton, polyethersulphone (PES), polycarbonate (PC), polyimide (PI), polyethyleneterephthalate (PET), polyethylenenaphthalate (PEN), polyacrylate (PAR), and fiber reinforced plastic (FRP).

The first substrate 112 may have a thickness of about 5 μm to about 200 μm. When the first substrate 112 has a thickness less than 5 μm, the first substrate 112 may not be able to support the OLED 21 in a stable manner. In contrast, when the first substrate 112 has a thickness more than 200 μm, the flexibility of the first substrate 112 may deteriorate.

A buffer layer 122 is disposed on the first substrate 112. The buffer layer 122 prevents infiltration of undesirable elements and provides a planar surface. As such, the buffer layer 122 may include materials appropriate for planarization and/or preventing infiltration of undesirable elements. For instance, the buffer layer 122 may be formed of any one of the following: a silicon nitride ($SiN_x$) layer, a silicon oxide ($SiO_2$) layer, or a silicon oxynitride ($SiO_xN_y$) layer. In some particular embodiments, the buffer layer 122 may be omitted depending on the material type of the first substrate 112 and the processing conditions thereof.

A switching semiconductor layer 131 and a driving semiconductor layer 132 are disposed on the buffer layer 122. The switching semiconductor layer 131 and the driving semiconductor layer 132 may be made of a transparent material (such as transparent zinc oxide or titanium oxide) instead of the opaque silicon that is used in a conventional thin film transistor.

A gate insulating layer 140 is disposed on the switching semiconductor layer 131 and the driving semiconductor layer 132. The gate insulating layer 140 may include at least one of tetraethylorthosilicate (TEOS), silicon nitride ($SiN_x$), and silicon oxide ($SiO_2$). For example, the gate insulating layer 140 may have a double-layer structure where a silicon nitride layer having a thickness of about 40 nm and a TEOS layer having a thickness of about 80 nm are sequentially laminated.

A gate wire including gate electrodes 152 and 155 is disposed on the gate insulating layer 140. The gate wire includes a gate line 151, a first capacitor 158, and other lines. The gate electrodes 152 and 155 are disposed overlapping at least parts of the semiconductor layers 131 and 132 and, more particularly, the channel regions of the semiconductor layers 131 and 132. The gate electrodes 152 and 155 prevent the channel regions from being doped with impurities when source regions 136 and drain regions 137 of the semiconductor layers 131 and 132 are doped with impurities (in the process of forming the semiconductor layers 131 and 132).

The gate electrodes 152 and 155 and the first capacitor 158 are disposed on the same layer, and are made of substantially the same metal material. The gate electrodes 152 and 155 and the first capacitor 158 may include at least one of aluminum-based metals (such as aluminum (Al) or aluminum alloys) or silver-based metals (such as silver (Ag) or silver alloys) having a transparent property.

An interlayer insulating layer 160 covering the gate electrodes 152 and 155 is disposed on the gate insulating layer 140. The interlayer insulating layer 160 may be formed of silicon nitride ($SiN_x$), silicon oxide ($SiO_x$), or tetraethoxysilane (TEOS), similar to the gate insulating layer 140; however, embodiments of the inventive concept are not limited thereto and the interlayer insulating layer 160 may be formed of other dielectric materials.

A data wire including source electrodes 173 and 176 and drain electrodes 174 and 177 is disposed on the interlayer insulating layer 160. The data wire includes a data line 171, a common power source line 172, a second capacitor 178, and other lines. The source electrodes 173 and 176 and the drain electrodes 174 and 177 are respectively connected to the source regions and the drain regions of the semiconductor layers 131 and 132 through a contact opening formed on the gate insulating layer 140 and the interlayer insulating layer 160. The data lines are formed of metal having the same transparent property as the gate lines.

Thus, a switching thin film transistor 10 includes a switching semiconductor layer 131, a switching gate electrode 152, a switching source electrode 173, and a switching drain electrode 174. A driving thin film transistor 20 includes a driving semiconductor layer 132, a driving gate electrode 155, a driving source electrode 176, and a driving drain electrode 177.

The thin film transistors 10 and 20 are formed having a transparent property. It should be noted that the configurations of the thin film transistors 10 and 20 are not limited to the above-described embodiments, and various modifications may be made by those skilled in the art.

In addition, a capacitor 80 includes a first capacitor 158 and a second capacitor 178 with an interlayer insulating layer 160 interposed therebetween.

The switching thin film transistor 10 may function as a switching element configured to select pixels to perform light emission. The switching gate electrode 152 is connected to the gate line 151. The switching source electrode 173 is connected to the data line 171. The switching drain electrode 174 is spaced apart from the switching source electrode 173 and connected to the first capacitor 158.

The driving thin film transistor 20 applies a driving power to a first electrode 211, which allows a light emitting layer 212 of the OLED 21 in the selected pixel to emit light. The driving gate electrode 155 is connected to the first capacitor 158. The driving source electrode 176 and the second capacitor 178 are respectively connected to the common power source line 172. The driving drain electrode 177 is connected to the first electrode 211 of the OLED 21 through a contact hole.

Using the above-described configuration, the switching thin film transistor 10 may be operated by a gate voltage applied to the gate line 151, and may transmit a data voltage applied to the data line 171 to the driving thin film transistor 20. A voltage equivalent to a difference between a common voltage applied from the common power source line 172 to the driving thin film transistor 20 and the data voltage transmitted from the switching thin film transistor 10 is stored in the capacitor 80, and current corresponding to the voltage stored in the capacitor 80 flows to the OLED 21 through the driving thin film transistor 20, such that the OLED 21 can emit light.

A planarization layer 180 is disposed so as to cover the data wire patterned on the same layer including the data line 171, the common power source line 172, the source electrodes 173 and 176, the drain electrodes 174 and 177, and the second capacitor 178.

The planarization layer 180 planarizes a surface of the OLED 21 by eliminating or reducing steps of the OLED 21 (that are formed thereon), thereby increasing luminance efficiency. The planarization layer 180 may be made of at least one of the following materials: polyacrylate resins, epoxy resins, phenolic resins, polyamide resins, polyimide resin, unsaturated polyester resin, polyphenylen ether resin, polyphenylene sulfide resin, and benzocyclobutene (BCB).

The first electrode 211 of the OLED 21 is disposed on the planarization layer 180. The first electrode 211 is connected to the drain electrode 177 through the contact hole formed on the planarization layer 180.

A pixel defining layer 190 defines a pixel area by exposing at least a part of the first electrode 211. The pixel defining layer 190 may be disposed on the planarization layer 180. The first electrode 211 is disposed corresponding to the pixel area defined by the pixel defining layer 190. The pixel defining layer 190 may be made of resins, such as polyacrylate resins or polyimide resins.

The light emitting layer 212 is disposed on the first electrode 211 on the pixel area, and a second electrode 213 is disposed on the pixel defining layer 190 and the light emitting layer 212. The light emitting layer 212 may be made of low molecular weight organic materials or high molecular weight organic materials. At least one of a hole injection layer (HIL) and a hole transporting layer (HTL) may be further disposed between the pixel electrode 211 and the light emitting layer 212, and at least one of an electron transporting layer (ETL) and an electron injection layer (EIL) may be further disposed between the light emitting layer 212 and the second electrode 213.

The first electrode 211 and the second electrode 213 may be formed as a transmissive electrode.

To produce the transmissive electrode, transparent conductive oxide (TCO) may be used. Examples of transparent conductive oxide (TCO) include indium tin oxide (ITO), indium zinc oxide (IZO), zinc oxide (ZnO), indium oxide ($In_2O_3$), etc.

A thin film encapsulation layer 250 is disposed on the second electrode 213. The thin film encapsulation layer 250 includes one or more inorganic layers 251, 253, and 255, and one or more organic layers 252 and 254. The thin film encapsulation layer 250 has a structure where inorganic layers 251, 253, and 255, and organic layers 252 and 254, are alternately laminated. In this case, the inorganic layer 251 is disposed at the lowest portion of the laminated structure. In other words, the inorganic layer 251 is disposed closest to the OLED 21. As shown in FIG. 4, the thin film encapsulation layer 250 includes three inorganic layers 251, 253, and 255, and two organic layers 252 and 254; however, embodiments of the inventive concept are not limited thereto, and the thin film encapsulation layer 250 may include fewer or more layers in other embodiments.

The inorganic layers 251, 253, and 255 include one or more of the inorganic materials $Al_2O_3$, $TiO_2$, ZrO, $SiO_2$, AlON, AlN, SiON, $Si_3N_4$, ZnO, and $Ta_2O_5$, and have a transparent property. The inorganic layers 251, 253, and 255 are formed using methods such as chemical vapor deposition (CVD) or atomic layer deposition (ALD). However, embodiments of the inventive concept are not limited thereto, and the inorganic layers 251, 253, and 255 may be formed using various methods known to those skilled in the art.

The organic layers 252 and 254 are made of polymer-based materials and have a transparent property. In this case, the polymer-based materials include acrylic resins, epoxy resins, polyimide, polyethylene, etc. The organic layers 252 and 254 are formed by a thermal deposition process. The thermal deposition process for forming the organic layers 252 and 254 is performed in a range of temperatures that do not damage the OLED 21. However, embodiments of the inventive concept are not limited thereto, and the organic layers 252 and 254 may be formed using various methods known to those skilled in the art.

A touch screen panel 500 may be further disposed on the thin film encapsulation layer 250. The presence and location of an input touch can be detected by the touch screen panel 500. For example, a user may touch the touch screen panel 500 using a stylus pen (or finger). The touch screen panel 500 may be made of a material having a transparent property.

The first display unit 110 may include one of an OLED element, a liquid crystal display element, and an electrophoretic element. The first display unit 110 is mechanically engaged with the first sliding unit 310. The first display unit 110 is capable of moving in a length direction of the first sliding unit 310 in a structure engaged with the first sliding unit 310. The first display unit 110 may be a transparent display panel.

The second display unit 120 includes a flat display substrate. The second display unit 120 is disposed parallel with the first display unit so as to overlap the first display unit 110. The first display unit 110 and the second display unit 120 may also be extended out. As illustrated in FIG. 4, when the display device is in the first mode, the second display unit 120 is disposed overlapping the first display unit 110. As illustrated in FIGS. 5 and 6, when the display device is in the second mode, the second display unit 120 does not overlap the first display unit 110 except at a predetermined portion in the middle.

The second display unit 120 may have the same area as the first display unit 110.

When the display device is in the first mode, the second display unit 120 and the first display unit 110 may be alternately disposed by one pixel width.

The second display unit 120 is configured to output a right image having a predetermined binocular parallax with a left image. The right image is the same as a right image output from a comparative stereoscopic image display but is distinct in that the image is not supposed to be viewed by only a right eye of a user.

Further, the left image and the right image are respectively output from the first display unit 110 and the second display unit 120 having different parallax. In more detail, image frames of the right image and the left image are output simultaneously (a spatial separation method) or alternately (a temporal separation method). Thus, a user may experience an effect of viewing a stereoscopic image with a right image and a left image having parallax provided to both eyes.

When a stereoscopic image is displayed in the spatial separation method of the overlap mode, the second display unit 120 and the first display unit 110 may be alternately disposed by one pixel width.

In addition, the display device according to an embodiment of the inventive concept may further include an image processor (not illustrated) configured to produce parallax between the right image and the left image.

The configuration of the second display unit 120 is substantially the same as the configuration of the first display unit 110, and a capping layer of the first display unit 110 and a capping layer of the second display unit 120 may be bonded together facing each other.

A transparent getter layer 160 may be further provided. The transparent getter layer 160 functions as a buffer layer between the first display unit 110 and the second display unit 120, and ensures light emitted from the respective display units 110 and 120 to other display units is not blocked.

The getter layer 160 also protects the display unit 100 from moisture and oxygen, and prevents moire phenomenon that is produced (for example, due to light interference caused by a pattern of the first electrode).

Further, the pixels of the second display unit 120 are disposed so as not to overlap the pixels of the first display unit 110 in the thickness direction.

In other words, when a user views an image from the front side of the first display unit 110, the pixels of the second display unit 120 are disposed so as not to overlap with the pixels of the first display unit 110.

A display device according to an embodiment of the inventive concept provides the overlap mode for outputting a stereoscopic image and the basic mode for outputting a flat image. In the overlap mode, a pixel of the first display unit 110 and a pixel of the second display unit 120 collectively constitute a unit pixel, whereas in the basic mode, each of the respective pixels of the respective display units 110 and 120 constitutes a unit pixel.

In other words, the number of unit pixels in the basic mode is twice the number of unit pixels in the overlap mode, and thus the resolution of a two-dimensional image output in the basic mode is twice the resolution of a left image or a right image output in the overlap mode.

In the overlap mode, the first display unit 110 and the second display unit 120 are alternately switched 'on/off,' whereas in the basic mode, the first display unit 110 and the second display unit 120 are switched 'on' simultaneously. Therefore, the resolution of the two dimensional image is twice the resolution of a left image or a right image.

Further, in the basic mode, a two-dimensional image is divided and respectively input to the first display unit 110 and the second display unit 120. For example, one half of the two-dimensional image is input to the first display unit 110 and the other half of the two-dimensional image is input to the second display unit 120.

Thus, the basic mode is advantageous compared to displaying a stereoscopic image display using a comparative polarization method, because both display units are used when displaying a two-dimensional image in the basic mode, thereby increasing the resolution.

Further, the display device according to an embodiment of the inventive concept has a resolution that is increased by twice when two transparent display units are used to output an image. However, three display units may be bonded together to increase the resolution by three times, and thus resolution may be increased by the number of bonded panels.

In the above embodiments, the pixels of the respective display units 110 and 120 do not overlap one another in the thickness direction.

The second display unit 120 is mechanically engaged with the second sliding unit 320. The second display unit 120 is capable of moving in the length direction of the second sliding unit 320 in a structure engaged with the second sliding unit 320. The second display unit 120 may include one of an OLED element, a liquid display element, and an electrophoretic element.

In FIGS. 1 to 4, a display device according to an embodiment of the inventive concept is depicted as a smartphone or a tablet PC; however, embodiments of the inventive concept are not limited thereto, and different types of display devices may be used. The first display unit 110 and the second display unit 120 may be configured to display the same image or different images.

The first driving unit 210 is disposed on one side of the first display unit 110, and the second driving unit 220 is disposed on one side of the second display unit 120.

The first driving unit 210 transmits a left image to the first display unit 110 and may include, for example, a driving integrated circuit (IC). The second driving unit 220 transmits a right image to the second display unit 120 and may include, for example, another driving IC. The first driving unit 210 and the second driving unit 220 may be respectively disposed at the opposite facing edge portions of the display unit 100 to avoid interference with each other.

The first driving unit 210 includes a first gate driving unit and a first data driving unit. The second driving unit 220 includes a second gate driving unit and a second data driving unit.

A plurality of first gate lines and a plurality of first data lines are disposed on the first display unit 110. A plurality of second gate lines and a plurality of second data lines are disposed on the second display unit 120.

A plurality of the first thin film transistors and a plurality of first capacitors are formed on the first display unit 110, and a plurality of the second thin film transistors and a plurality of second capacitors are formed on the second display unit 120. The plurality of first thin film transistors are electrically connected to the corresponding first gate lines and first data lines, and charge the corresponding first capacitors. The second thin film transistors are electrically connected to the corresponding second gate lines and second data lines, and charge the corresponding second capacitors.

The plurality of first gate lines receive a first gate signal from the first gate driving unit, and the plurality of first data lines receive a first data signal from the first data driving unit. The plurality of second gate lines are supplied with a second gate signal from the second gate driving unit, and the plurality of second data lines are supplied with a second data signal from the second data driving unit.

Accordingly, in the second mode, the first display unit 110 displays a first part of an image in response to the first gate and data signals, and a second display unit 120 displays a second part of the image (namely the other part of the image) in response to the second gate and data signals.

A timing controller controls the first and second gate driving units and the first and second data driving units in response to the various control signals and the image data.

In more detail, the timing controller provides the first and second gate control signals to the first and second gate driving units, respectively. Further, the timing controller respectively provides the first and second image data corresponding to the first and second data control signals and the first and second data signals to the first and second data driving units. In this case, the data for one image is divided into first and second image data and supplied to the first and second data driving units, respectively.

When the display device is driven in the second mode, the first and second gate driving units are simultaneously turned on in response to the first and second gate control signals, and output the first and second gate signals, respectively. Further when driven in the second mode, the first and second data driving units output the first and second data signals in response to the first and second data control signals, respectively. In this case, the first data signal corresponds to the first part of the image, and the second data signal corresponds to the second part of the image (namely the other part of the image).

Also, first and second data driving chips are provided with the first and second data driving units, and are disposed on the first driving unit 210 and the second driving unit 220.

Similarly, first and second gate driving chips are provided with the first and second gate driving units, and are disposed on the first driving unit 210 and the second driving unit 220.

Meanwhile, when the display device is in the first mode, the first driving unit 210 may supply a data signal corresponding to a left image as in the second mode, such that the first display unit 110 can be driven. Likewise, the second driving unit 220 may supply a data signal corresponding to a right image as in the second mode, such that the second display unit 120 can be driven.

A camera 400 processes an image frame (such as a static image or a moving picture) that is detected by an image sensor in a video telephone mode or a photograph mode. Subsequently, the processed image frame can be displayed on the display unit 100.

The camera 400 may be disposed on one of the first driving unit 210 or the second driving unit 220. The image frame processed by the camera 400 may be stored in the first driving unit 210 or the second driving unit 220, or transmitted to the outside through a wireless communication unit. Two or more cameras 400 may be included depending on the configuration of the display device.

As described above, referring to FIG. 2, the display device according to an embodiment of the inventive concept outputs a two-dimensional image or a three-dimensional image in the first mode. That is, the display device according to an embodiment of the inventive concept may output a two-dimensional image or a three-dimensional image when the first display unit 110 and the second display unit 120 completely overlap.

With reference to FIG. 5, the display device according to an embodiment of the inventive concept can be driven in the wide mode of the second mode. That is, the first display unit 110 and the second display unit 120 may be respectively moved in the opposite direction by the sliding unit, and the display device may display an image with a screen that is twice as large by adding the first display unit 110 and the second display unit 120.

When a large screen is arranged in the wide mode, the timing controller provides the first and second image data corresponding to the first and second data control signals and the first and second data signals to the first driving unit 210 and the second driving unit 220, respectively. In this case, the data for one image is divided into first and second image data and supplied to the first driving unit 210 and the second driving unit 220, respectively. The timing controller may be disposed inside of the first driving unit 210 or the second driving unit 220.

With reference to FIG. 6, in the separation mode of the second mode, the display device according to an embodiment of the inventive concept may include a multi-window. The first display unit 110 and the second display unit 120 may be extended out and can display images different from each other. As illustrated in FIG. 6, a photograph may be taken with the camera 400 on the first display unit 110, and a messenger program may be operated to communicate with another user on the second display unit 120. Further, the first display unit 110 and the second display unit 120 are linked, and thus a photograph taken by the first display unit 110 may be transmitted to the messenger program operated in the second display unit 120.

Next, an engagement configuration of the sliding unit, the first display unit 110, and the second display unit 120 according to an embodiment of the inventive concept are described with reference to FIGS. 7 to 12.

Figure 7:
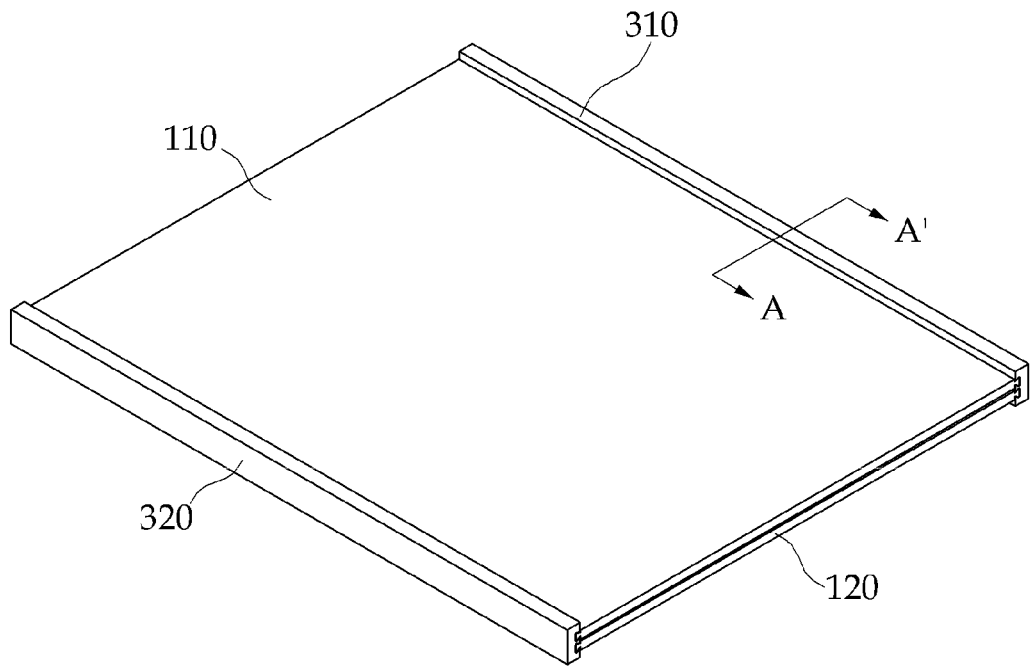
FIG. 7 is a schematic perspective view illustrating the first display unit, the second display unit, and the sliding unit of FIG. 1.
Figure 8:
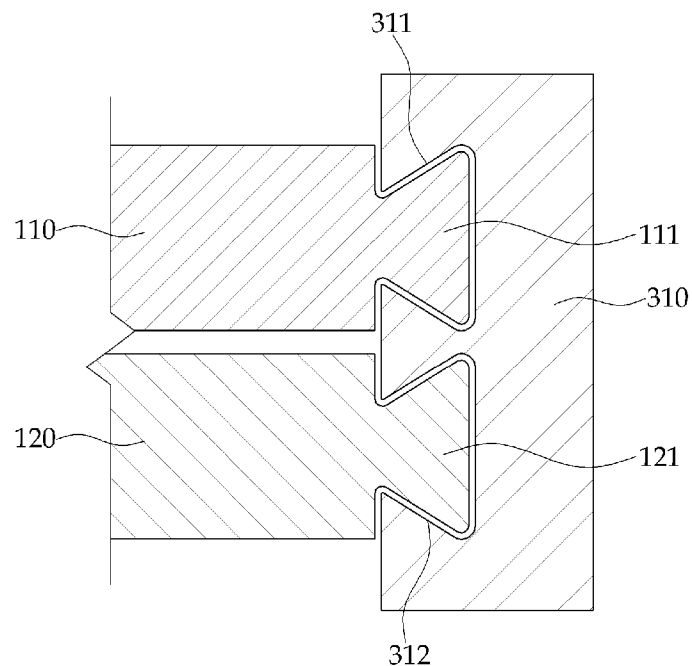
FIG. 8 is a cross-sectional view taken along line A-A' of FIG. 7.
Figure 9:
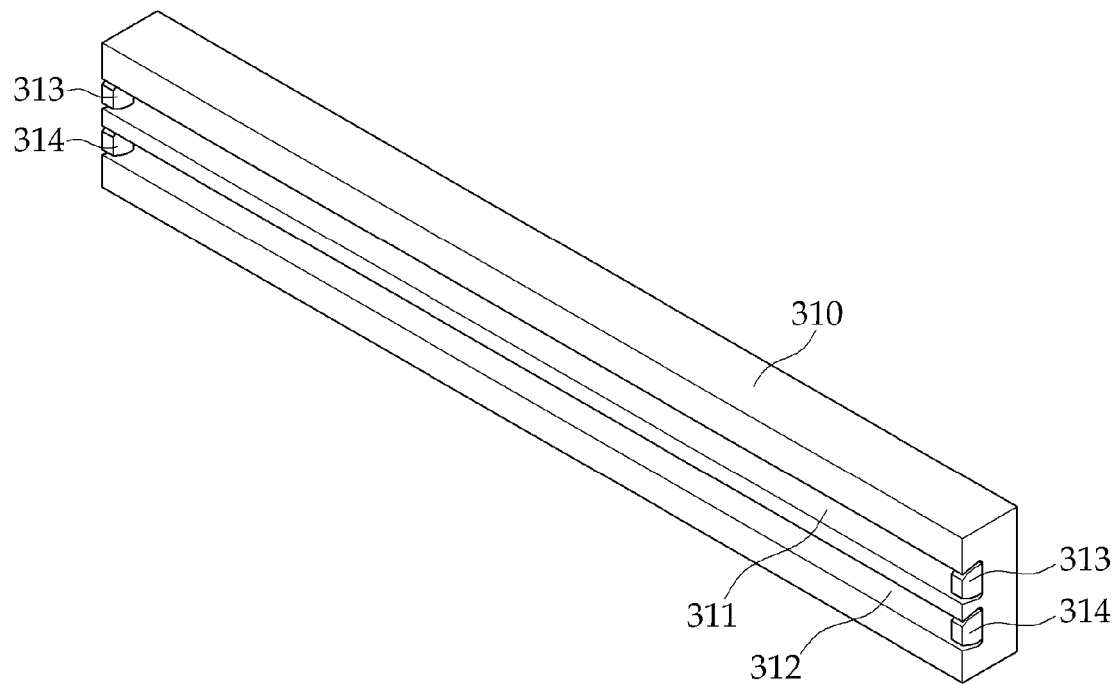
FIG. 9 is a schematic perspective view showing the sliding bar of FIG. 1.
Figure 10:
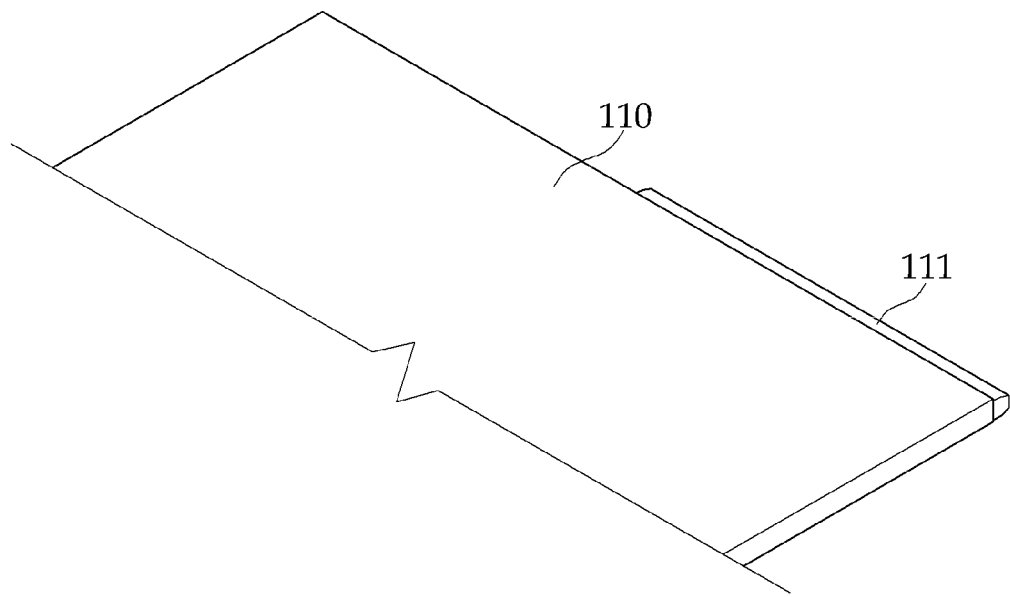
FIG. 10 is a schematic perspective view showing an end portion of the first display unit of FIG. 1.
Figure 11:
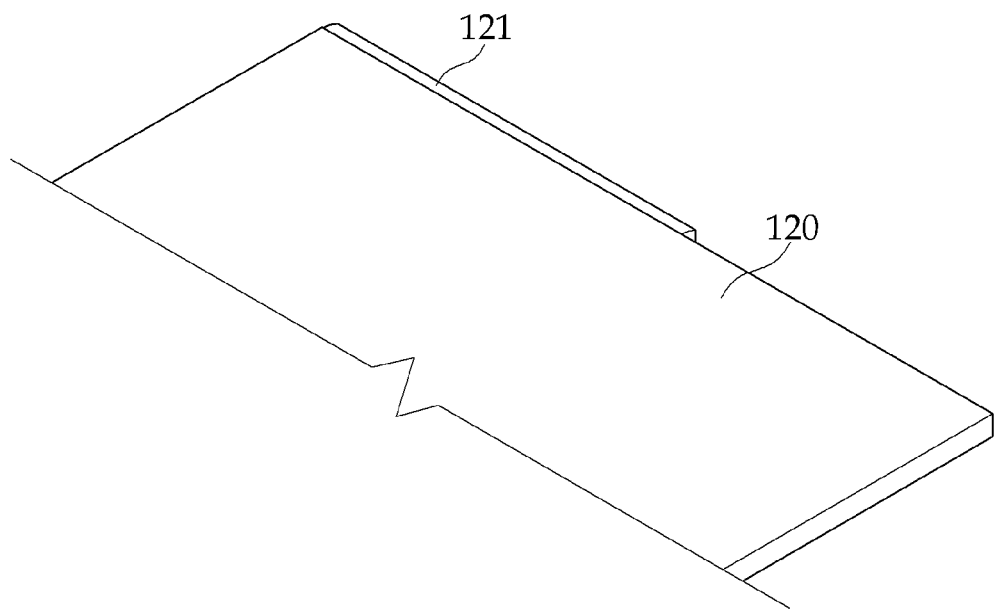
FIG. 11 is a schematic perspective view showing an end portion of the second display unit of FIG. 1.
Figure 12:
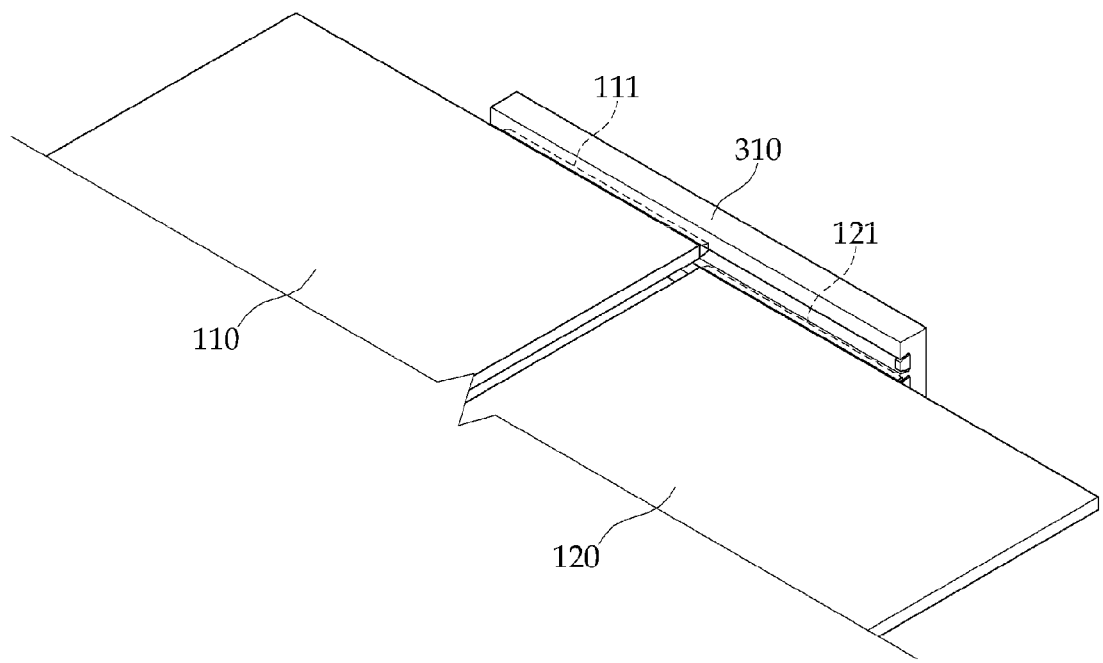
FIG. 12 is a schematic perspective view illustrating a state where the first display unit and the second display unit of FIG. 1 are extended out.

FIG. 7 is a schematic perspective view illustrating the first display unit, the second display unit, and the sliding unit of FIG. 1. FIG. 8 is a cross-sectional view taken along line A-A' of FIG. 7. FIG. 9 is a schematic perspective view showing the sliding bar of FIG. 1. FIG. 10 is a schematic perspective view showing an end portion of the first display unit of FIG. 1. FIG. 11 is a schematic perspective view showing an end portion of the second display unit of FIG. 1. FIG. 12 is a schematic perspective view illustrating a state where the first display unit and the second display unit of FIG. 1 are extended out.

With reference to FIGS. 7 to 12, the first display unit 110 and the second display unit 120 may be mechanically engaged with the sliding unit, and are capable of being moved in the length direction of the sliding unit.

The sliding unit includes the first sliding unit 310 and the second sliding unit 320. The sliding unit has at least one engaging groove which the first display unit 110 and the second display unit 120 are inserted into and slide through.

The first sliding unit 310 is engaged with an end portion of the first display unit 110 and an end portion of the second display unit 120. The second sliding unit 320 is engaged with the other end portion of the first display unit 110 and the other end portion of the second display unit 120.

The first sliding unit 310 and the second sliding unit 320 may be disposed facing each other.

The first sliding unit 310 and the second sliding unit 320 have the same configuration except for their positions. As such, the sliding unit will be described with reference to the first sliding unit 310.

With reference to FIGS. 8 and 9, the first sliding unit 310 has first and second engaging grooves 311 and 312 and includes first and second stoppers 313 and 314. The first and second engaging grooves 311 and 312 are formed parallel to each other in the positions corresponding to the first and second display units 110 and 120, respectively.

The first stoppers 313 are disposed on both sides of the first engaging groove 311 and affix the first display unit 110 when driven in the first mode or the second mode. The second stoppers 314 are disposed on both sides of the second engaging groove 312 and affix the second display unit 120 when driven in the first mode or the second mode.

With reference to FIGS. 8 and 10, the first display unit 110 has a first engaging protrusion 111 formed on at least one end portion. The first engaging protrusion 111 is formed on a predetermined portion of an end portion of the first display unit 110. The length of the first engaging protrusion 111 is determined based on the range of movement of the first display unit 110. In more detail, the first display unit 110 is engaged with the first sliding unit 310 to overlap the first sliding unit 310 in the first mode. On the other hand, the first display unit 110 is engaged with the first sliding unit 310 to overlap half the length of the first sliding unit 310 in the second mode. That is, the first engaging protrusion 111 is formed based on the moving length and direction of the first display unit 110 that moves in the length direction of the first sliding unit 310. In an embodiment of the inventive concept, the first display unit 110 may move halfway to the left, and thus the first engaging protrusion 110 may be formed at the middle of the left side of one end portion of the first display unit 110. However, embodiments of the inventive concept are not limited thereto, and the first engaging protrusion 111 may be formed in various ways depending on the moving length and direction of the first display unit 110.

With reference to FIGS. 8 and 11, the second display unit 120 has a second engaging protrusion 121 formed on at least one end portion. The second engaging protrusion 121 is formed on a predetermined portion of one end portion of the second display unit 120. For example, the second engaging protrusion 121 may be formed at the middle of the right side of one end portion of the second display unit 120. The second engaging protrusion 121 may be formed in various ways depending on the moving length and direction of the second display unit 120, similar to the first engaging protrusion 111 described above.

With reference to FIG. 8, the first and second engaging protrusions 111 and 121 slide through and are inserted into the first and second engaging grooves 311 and 312, respectively. Meanwhile, in the first mode described in FIGS. 7 and 8, the first engaging protrusion 111 of the first display unit 110 is formed at the middle of the right side of the first engaging groove 311, and the second engaging protrusion 121 of the second display unit 120 is formed at the middle of the left side of the second engaging groove 312.

With reference to FIG. 12, in the second mode, the first and second display units 110 and 120 are extended out in the first sliding unit 310. In the second mode described in FIG. 12, the first engaging protrusion 111 of the first display unit 110 is formed at the middle of the left side of the first engaging groove 311, and the second engaging protrusion 121 of the second display unit 120 is formed at the middle of the right side of the second engaging groove 312.

Next, an engagement configuration of a sliding unit, a first display unit 110, and a second display unit 120 according to another embodiment of the inventive concept will be described with reference to FIGS. 13 to 16. A repeated description of the same configurations illustrated in the previously-described embodiments shall be omitted. Since a second sliding unit 320 has the same configuration as a first sliding unit 310, the sliding unit will be described with reference to the first sliding unit 310.

Figure 13:
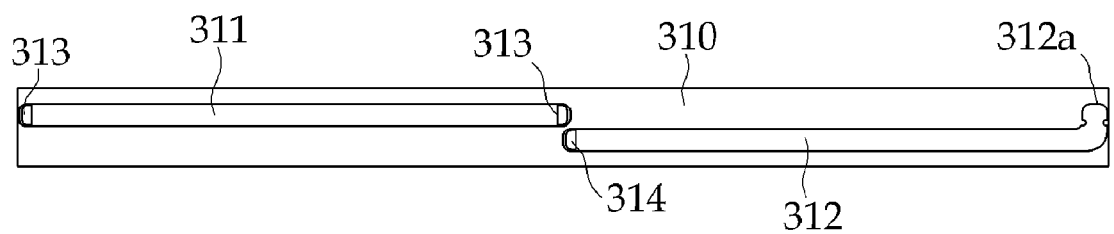
FIG. 13 is a schematic front view showing a sliding bar according to another embodiment of the inventive concept.
Figure 14:
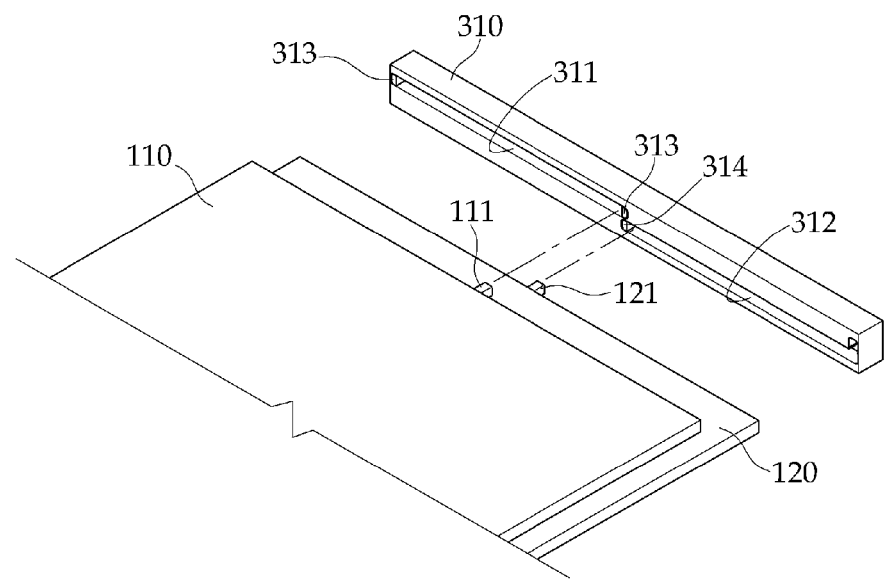
FIG. 14 is an exploded perspective view showing an engagement configuration of the sliding bar, a first display unit, and a second display unit according to the another embodiment of the inventive concept.
Figure 15:
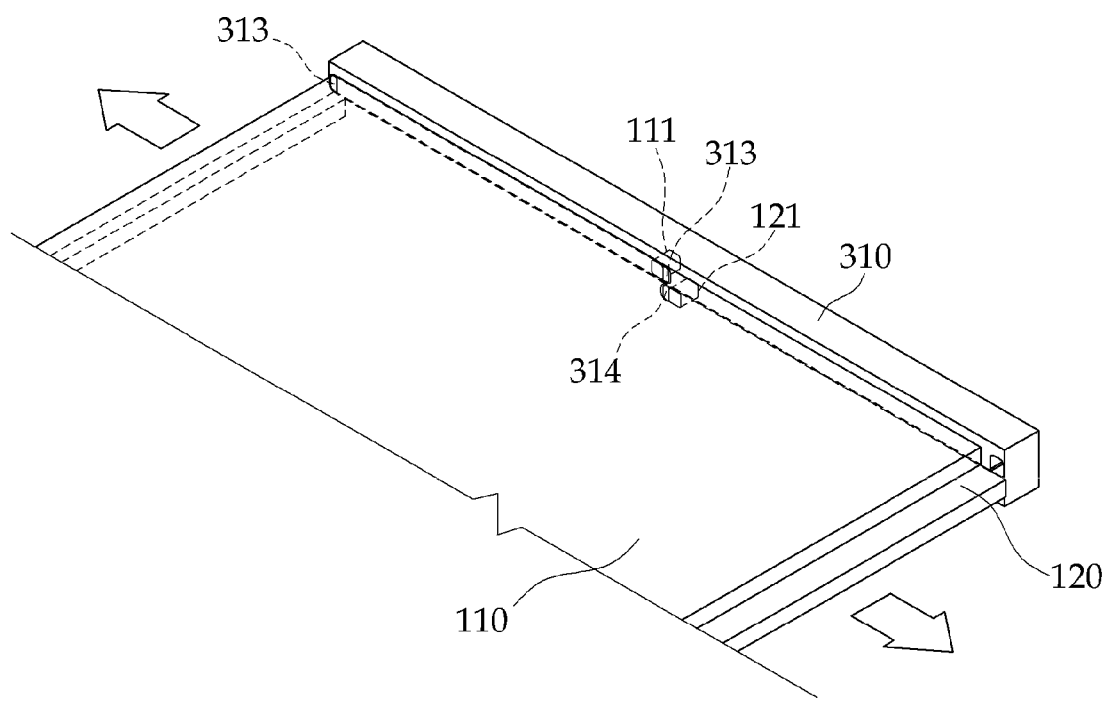
FIG. 15 is a perspective view showing the engagement configuration of the sliding bar, the first display unit, and the second display unit of FIG. 14.
Figure 16:
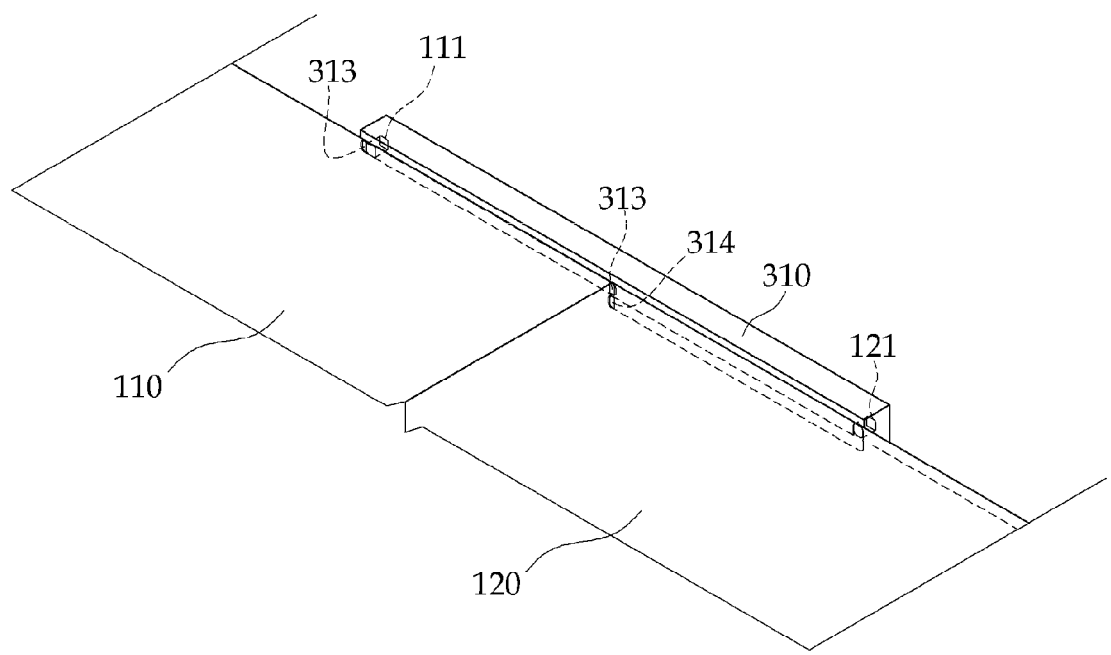
FIG. 16 is an exploded schematic perspective view illustrating a state where the first display unit and the second display unit of FIG. 15 are extended out.

FIG. 13 is a schematic front view showing a sliding bar according to another embodiment of the inventive concept. FIG. 14 is an exploded perspective view showing an engagement configuration of the sliding bar, a first display unit, and a second display unit according to the another embodiment of the inventive concept. FIG. 15 is a perspective view showing an engagement configuration of the sliding bar, the first display unit, and the second display unit of FIG. 14. FIG. 16 is an exploded schematic perspective view illustrating a state where the first display unit and the second display unit of FIG. 15 are extended out.

With reference to FIGS. 13 to 14, the first sliding bar 310 has a first engaging groove 311 and a second engaging groove 312.

The first engaging groove 311 is formed on the top portion of a surface of the first sliding bar 310. The first engaging groove 311 extends to half the length of the left side in the length direction of the first sliding bar 310. For example, the length of the first engaging groove 311 is half the length of the first display unit 110. The first stopper 313 is disposed on both sides of the first engaging groove 311. The first stopper 313 affixes the first engaging protrusion 111. For example, the first stopper 313 and the first engaging protrusion 111 may have an engagement structure.

The first display unit 110 includes the first engaging protrusion 111 on at least one end portion. The first engaging protrusion 111 may protrude from the center portion of a surface of the first display unit 110. The first engaging protrusion 111 is inserted into the first engaging groove 311. The first engaging protrusion 111 may move in the right and left sides of the first engaging groove 311. Accordingly, the first display unit 110 may be converted into the first and second modes by the movement of the first engaging protrusion 111.

The second engaging groove 312 is formed on the lower portion of a surface of the first sliding bar 310. The second engaging groove 312 extends to half the length of the right side in the length direction of the first sliding bar 310. For example, the length of the second engaging groove 312 is half the length of the second display unit 120. The second stopper 314 is disposed on one end portion of the second engaging groove 312, and a locking groove 312a is formed on the other end portion of the second engaging groove 312. The second stopper 314 affixes the second engaging protrusion 121. For example, the second stopper 314 and the second engaging protrusion 121 may have an engagement structure.

The second engaging groove 312 is formed having a predetermined length in the same direction, and a predetermined portion of an end portion (of the second engaging groove 312) is provided in a bending form. The locking groove 312a is formed on the bending portion of the second engaging groove 312. Accordingly, the second engaging protrusion 121 slides through the upper portion of the first sliding unit 310 and is inserted into and affixed to the locking groove 312a.

The second display unit 120 includes the second engaging protrusion 121 on at least one end portion. The second engaging protrusion 121 may protrude from the center portion of a surface of the second display unit 120. The second engaging protrusion 121 is inserted into the second engaging groove 312. The second engaging protrusion 121 may move in the right and left sides of the second engaging groove 312. Accordingly, the second display unit 120 may be converted into the first or second modes by the movement of the second engaging protrusion 121.

With reference to FIGS. 15 and 16, the first display unit 110 and the second display unit 120 may move to the left and right sides, respectively. In the first mode, the first display unit 110 may be disposed overlapping the first sliding bar 310. The first engaging protrusion 111 is inserted into the first engaging groove 311 and affixed to the first stopper 313 disposed at the middle of the first sliding bar 310. In the first mode, the second display unit 120 is disposed overlapping the first sliding bar 310. The second engaging protrusion 121 is inserted into the second engaging groove 312 and affixed to the second stopper 314.

In the second mode, the first display unit 110 is moved to the left side, and the first engaging protrusion 111 is affixed to the first stopper 313 disposed on one end portion of the left side of the first sliding bar 310. In the second mode, the second display unit 120 is moved to the right side, and the second engaging protrusion 121 is engaged and affixed to the locking groove 312a. The second display unit 120 is moved to the right side and inserted into the locking groove 312a, such that the second display unit 120 is raised to the height of the first display unit 110. The second display unit 120 is disposed at the same height as the first display unit 110 and has a surface in contact with the first display unit 110. Thus, according to another embodiment of the inventive concept, the first display unit 110 and the second display unit 120 are in contact with each other in the second mode.

Next, with reference to FIGS. 17 to 20, an engagement configuration of a sliding unit, a first display unit 110, and a second display unit 120 according to a further embodiment of the inventive concept will be described. A repeated description of the same configurations illustrated in the above-described embodiments shall be omitted. A second sliding unit 320 has the same configuration as a first sliding unit 310. As such, the sliding unit will be described with reference to the first sliding unit 310.

Figure 17:
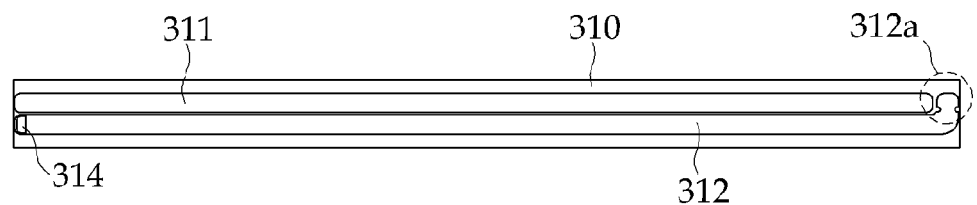
FIG. 17 is a schematic front view illustrating a sliding bar according to a further embodiment of the inventive concept.
Figure 18:
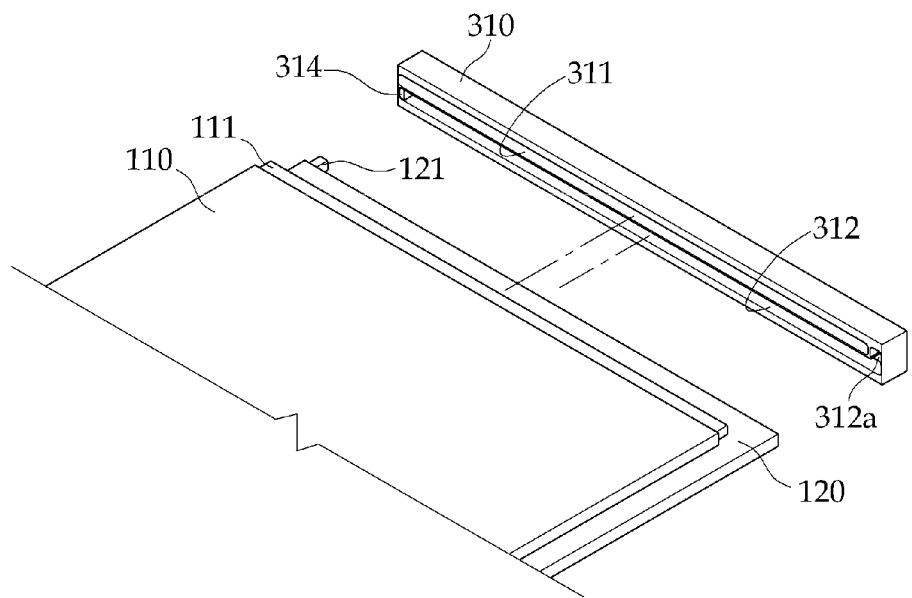
FIG. 18 is an exploded perspective view showing an engagement configuration of the sliding bar, a first display unit, and a second display unit according to the further embodiment of the inventive concept.
Figure 19:
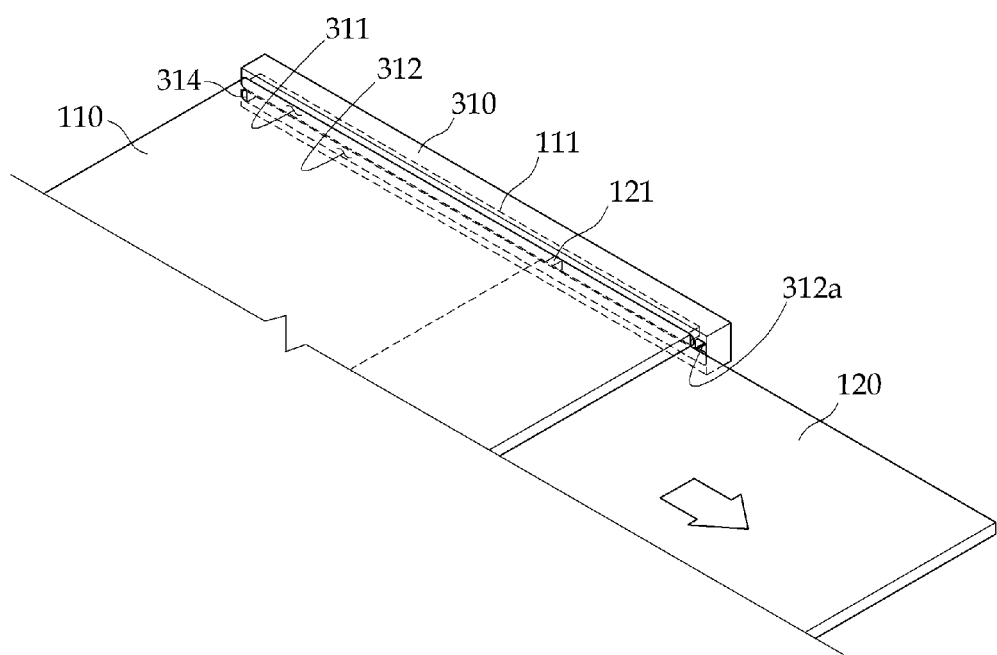
FIG. 19 is a perspective view showing the engagement configuration of the sliding bar, the first display unit, and the second display unit of FIG. 18.
Figure 20:
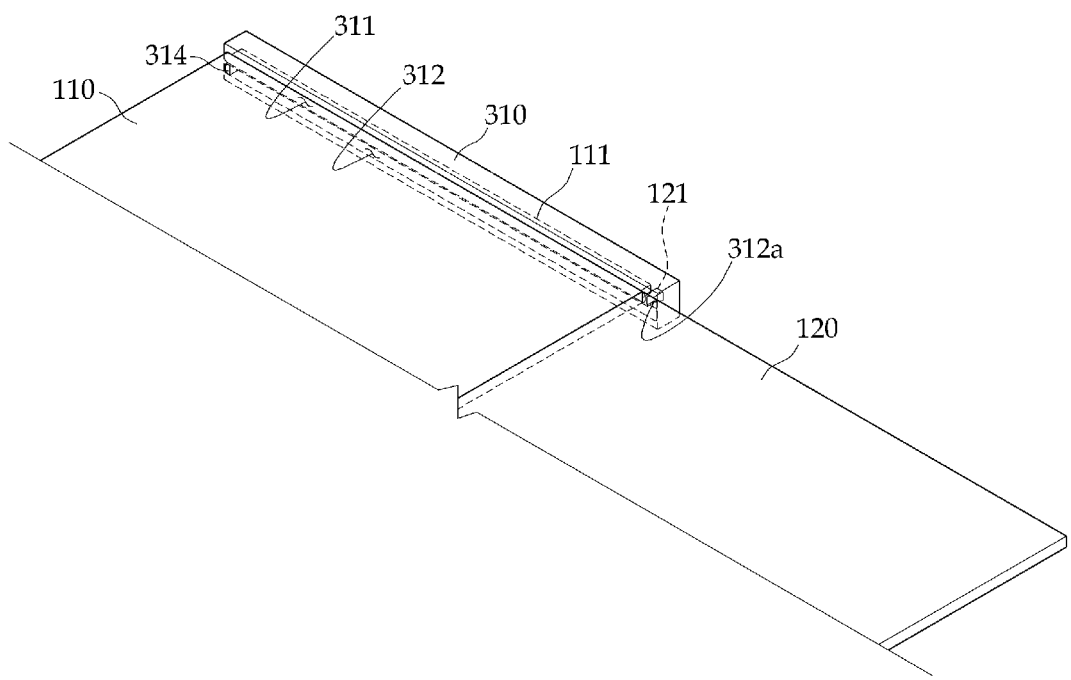
FIG. 20 is a schematic perspective view illustrating a state where the first display unit and the second display unit of FIG. 19 are extended out.

FIG. 17 is a schematic front view illustrating a sliding bar according to a further embodiment of the inventive concept. FIG. 18 is an exploded perspective view showing an engagement configuration of the sliding bar, a first display unit, and a second display unit according to the further embodiment of the inventive concept. FIG. 19 is a perspective view showing the engagement configuration of the sliding bar, the first display unit, and the second display unit of FIG. 19. FIG. 20 is a schematic perspective view illustrating a state where the first display unit and the second display unit of FIG. 19 are extended out. With reference to FIGS. 13 and 14, the first sliding bar 310 has a first engaging groove 311 and a second engaging groove 312.

With reference to FIGS. 17 and 18, the first engaging groove 311 is formed on the upper portion of a surface of the first sliding bar 310. The first engaging groove 311 extends in the length direction of the first sliding bar 310. For example, the first engaging groove 311 may have the same length as the first sliding unit 310 or a slightly shorter length compared to the first sliding unit 310, as illustrated in FIG. 17.

The first display unit 110 includes the first engaging protrusion 111 on at least one end portion. The first engaging protrusion 111 may protrude extended in length. The first engaging protrusion 111 is inserted into the first engaging groove 311. The first engaging protrusion 111 is engaged with the first engaging groove 311, such that the first display unit 110 can be fixed. That is, the first display unit 110 of FIG. 17 is different from the previously-described embodiments in that the first display unit 110 of FIG. 17 is fixed instead of being movable.

The second engaging groove 312 is disposed at the lower portion of a surface of the first sliding bar 310. The second engaging groove 312 extends in a length direction of the first sliding bar 310. For example, the second engaging groove 312 may have the same length as the first sliding unit 310 or a slightly shorter length compared to the first sliding unit 310, as illustrated in FIG. 17. The second stopper 314 is disposed at one end portion of the second engaging groove 312, and a locking groove 312a is formed at the other end portion of the second engaging groove 312. The second stopper 314 affixes the second engaging protrusion 121. For example, the second stopper 314 and the second engaging protrusion 121 may have an engagement structure.

The second engaging groove 312 has a predetermined length in the same direction, and a predetermined portion of an end portion (of the second engaging groove 312) is formed in a bending form. Thus, the second engaging protrusion 121 slides through the upper portion of the first sliding unit 310 and is inserted into and affixed to the locking groove 312a.

The second display unit 120 includes the second engaging protrusion 121 on at least one end portion. The second engaging protrusion 121 may protrude from the center portion of a surface of the second display unit 120. The second engaging protrusion 121 is inserted into the second engaging groove 312. The second engaging protrusion 121 may move in the right and left sides of the second engaging groove 312. Accordingly, the second display unit 120 may be converted into the first mode or the second mode by the movement of the second engaging protrusion 121.

With reference to FIGS. 19 and 20, the second display unit 120 is capable of moving to the left and right sides. In the first mode, the first engaging protrusion 111 is inserted into the first engaging groove 311, such that the first display unit 110 is affixed overlapping the first sliding unit 310. In the first mode, the second display unit 120 is disposed overlapping the first sliding bar 310. The second engaging protrusion 121 is inserted into the second engaging groove 312 and affixed to the second stopper 314.

In the second mode, the first display unit 110 is fixed as in the first mode. In the second mode, the second display unit 120 is moved to the right side and the second engaging protrusion 121 is engaged with and affixed to the locking groove 312a. The second display unit 120 is moved to the right side and inserted into the locking groove 312a, such that the second display unit 120 is raised to the height of the first display unit 110. The second display unit 120 is disposed at the same height as the first display unit 110 and has a surface in contact with the first display unit 110. Thus, according to the further embodiment of the inventive concept, the first display unit 110 and the second display unit 120 are in contact with each other in the second mode.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A display device comprising: a first display unit having a first engaging protrusion; a second display unit having a second engaging protrusion configured to be slidably disposed with respect to the first display unit in a first position or a second position, wherein the first display unit and the second display unit overlap in the first position; a sliding unit having two engaging grooves coupled to the first engaging protrusion of the first display and the second engaging protrusion of the second display unit, respectively; a first driving unit coupled to the first display unit and disposed at a first edge portion of the display device; and a second driving unit coupled to the second display unit and disposed at an opposing edge portion of the first edge portion, wherein the first driving unit and the second driving unit slidably extend out from the sliding unit in opposite directions, respectively, and wherein one of the two engaging grooves has a bending portion and a locking groove extending from the bending portion, configured to dispose the first display unit and the second display unit on the same height in the second position.

2. The display device of claim 1, wherein the first display unit and the second display unit include flat panel display substrates.

3. The display device of claim 1, wherein the first display unit and the second display unit have a same area.

4. The display device of claim 3, wherein the first display unit and the second display unit are alternately disposed by one pixel width.

5. The display device of claim 1, wherein the sliding unit further comprises:
a first sliding unit engaged with one end portion of the first display unit and one end portion of the second display unit; and
a second sliding unit engaged with the other end portion of the first display unit and the other end portion of the second display unit, separated from the first sliding unit.

6. The display device of claim 5, wherein the first sliding unit and the second sliding unit are disposed facing each other.

7. The display device of claim 1, wherein the first engaging protrusion protrudes from a center portion of a side of the first display unit and the second engaging protrusion protrudes from a center portion of a side of the second display unit.

8. The display device of claim 7, wherein the sliding unit further comprises:
a first engaging groove in which the engaging protrusion formed on the end portion of the first display unit is inserted; and
a second engaging groove in which the engaging protrusion formed on the end portion of the second display unit is inserted.

9. The display device of claim 8, wherein the second engaging groove is disposed parallel with the first engaging groove.

10. The display device of claim 9, wherein the second engaging groove includes at least one end portion provided in a bending form bending towards the first engaging groove.

11. The display device of claim 10, wherein the locking groove is formed on the bending portion of the second engaging groove.

12. The display device of claim 7, wherein the sliding unit further comprises a stopper configured to affix the engaging protrusions.

13. The display device of claim 1, wherein the first display unit comprises one of an organic light emitting diode (OLED) element, a liquid crystal display element, and an electrophoretic element.

14. The display device of claim 1, wherein the second display unit comprises one of an organic light emitting diode (OLED) element, a liquid crystal display element, and an electrophoretic element.

15. The display device of claim 1, wherein the first display unit and the second display unit respectively display a left image and a right image having different parallax when the first display unit and the second display unit overlap.

16. The display device of claim 1, wherein the first display unit and the second display unit display a single high resolution image when the first display unit and the second display unit overlap.

17. The display device of claim 1, wherein a single image is divided into two parts and the first display unit and the second display unit respectively display the parts of the divided image when the first display unit and the second display unit are extended out.

18. The display device of claim 1, wherein the first display unit and the second display unit display different images when the first display unit and the second display unit are extended out.

19. The display device of claim 1, wherein the first driving unit and the second driving unit slidably extend out from the sliding unit in opposite directions, together with the first display unit and the second display unit, respectively.

* * * * *